(12) United States Patent
Robinson

(10) Patent No.: US 7,478,879 B2
(45) Date of Patent: *Jan. 20, 2009

(54) SEAT WITH DUAL INDEPENDENTLY ADJUSTABLE SUPPORTS

(76) Inventor: Garry Robinson, P.O. Box 53, Louis Creek (CA) V0E 2E0

( * ) Notice: Subject to any disclaimer, the term of this patent is extended or adjusted under 35 U.S.C. 154(b) by 105 days.

This patent is subject to a terminal disclaimer.

(21) Appl. No.: 11/542,130

(22) Filed: Oct. 4, 2006

(65) Prior Publication Data

US 2007/0029854 A1    Feb. 8, 2007

Related U.S. Application Data

(63) Continuation-in-part of application No. 10/836,212, filed on May 3, 2004, now Pat. No. 7,134,721.

(30) Foreign Application Priority Data

Nov. 27, 2003    (CA) .................................... 2449382

(51) Int. Cl.
    *A47C 3/025*    (2006.01)
(52) U.S. Cl. .............................. 297/284.3; 297/284.11; 297/DIG. 3; 297/486; 297/487

(58) Field of Classification Search ............ 297/452.41, 297/487, 486, 284.3, 284.11, 284.1, 344.16, 297/344.15, DIG. 3; 248/421
See application file for complete search history.

(56) References Cited

U.S. PATENT DOCUMENTS

| 4,846,527 | A | * | 7/1989 | Julien et al. ............ 297/411.36 |
| 5,080,439 | A | * | 1/1992 | Takahashi et al. ........... 297/464 |
| 6,036,271 | A | * | 3/2000 | Wilkinson et al. ..... 297/452.41 |
| 6,209,159 | B1 | * | 4/2001 | Murphy ......................... 5/654 |

* cited by examiner

*Primary Examiner*—Milton Nelson, Jr.
(74) *Attorney, Agent, or Firm*—Antony C. Edwards

(57) ABSTRACT

A seat, which provides an enhanced level of comfort, by the use of dual independently supported seat cushions is disclosed. The apparatus comprises an inner seat cushion and an outer seat cushion, each of which is independently supported by a compressed air pneumatic device to control vertical movement, and by parallelogram linkages control lateral movement, and allow for vertical transition of the seats while maintaining them horizontal. The occupant of this seat can independently adjust the distribution of body weight shared by the inner seat cushion and the outer seat cushion from time to time, in order to change the pressure pattern against body parts and to provide optimum ergonomic seating posture. Furthermore, by adjusting the air supply, the occupant can increase or decrease the seat's effective spring rate.

25 Claims, 15 Drawing Sheets

SEAT WITH DUAL INDEPENDENTLY ADJUSTABLE SUPPORTS

CROSS REFERENCE TO RELATED APPLICATION

This application is a Continuation-in-Part of U.S. patent application Ser. No. 10/836,212 filed May 3, 2004, now issued as pat. No. 7,134,721, which claims priority from Canadian Patent Application No. 2,449,382 filed Nov. 27, 2003 entitled Vehicle Seat with Dual Independently Adjustable Supports.

FIELD OF THE INVENTION

The present invention relates to seats or chairs generally, and in particular to a seat with dual independently adjustable supports.

BACKGROUND OF THE INVENTION

In the prior art, it is common practice for heavy duty vehicle seats to be constructed on a sub-base with a pivoted parallelogram linkage and a compressed air actuator supporting the seat cushion in position above a fixed base, and with an adjusting valve to regulate the air supply to the air actuator, thereby permitting the occupant of the seat to adjust the ride height of the seat. Such prior art vehicle seats provide a wide range of height adjustment, and the ability to absorb much more of the energy from severe jolts than is possible with a simple rigid seat with foam padding or with air bladder style seat cushions.

Operators of trucks off-highway mobile equipment, long-range transports including aircraft, and in many other environments are required to spend many hours sitting during each working day. Often they are subjected to continual bouncing and vibration, although the present invention is restricted to such environments as improved seats according to the present invention may be advantageously employed in many applications where workers must sit for extended periods resulting in related injuries such as chronic lower back pain and circulatory deficiencies.

In a seated posture, the occupant's body weight is centered over the pelvis, while the legs extend laterally forward of the torso. The pressure between the seat cushions and the driver's body is distributed most predominantly in the area of the pelvis, thus transmitting most of the seating pressure directly through the pelvis directly into the spine. As seat cushions conform to the shape of the occupant's body parts, which are in supportive contact with the seat cushions, there is a reduction of blood circulation in those areas, and fatigue in the joints such as the lower vertebrae, which are subjected to continual compression. Furthermore, because the body weight is supported mainly through the pelvis, the weight of the occupant's legs and lower torso adds to the total weight supported by the base of the spine.

In the prior art, various seats with a plurality of portions which can be varied with respect to form and hardness have been proposed. Such seats are disclosed in U.S. Pat. No. 5,263,765, Hideyuki Nagashima, and U.S. Pat. No. 5,320,409, Kazuhito Katoh, in which a plurality of inflatable bladders are strategically positioned within the seat and are selectively inflated and deflated under the control of a fatigue sensing means.

SUMMARY OF THE INVENTION

The apparatus of the present invention constitutes an improvement over the prior art by permitting the occupant of the seat to adjust the pressure distribution of the seat against the occupant's body parts from time to time, while maintaining the soft ride characteristics of a pivoted linkage type of seat. In a preferred embodiment of the present invention, hereinafter alternatively referred to as a "dual ride seat", an inner seat including its cushion is mounted on a first sub-base supported by a first air actuator, and retained laterally by a lower parallelogram linkage configured so that by adding air into the first air actuator, the inner seat including its cushion and the outer seat including its cushion are caused to rise approximately vertically with respect to the vehicle floor. The pressure of the air in the first air actuator is adjusted manually to balance the weight of the occupant plus the two cushion assemblies at a ride height of the occupant's choosing. The inner seat and cushion is shaped and positioned to support the pelvic area directly below the base of the spine of a person sitting on the seat. An outer seat and its cushion is mounted on a second sub-base supported by a second air actuator, and retained laterally by an upper parallelogram linkage configured so that by adding air into the second air actuator, the outer seat and cushion is caused to rise approximately vertically with respect to the inner seat and cushion. The pressure of the air in the second air actuator is adjusted manually to change the amount of the occupant's weight supported by the outer seat and its cushion assembly. The outer seat and its cushion is shaped and positioned to support the backside of the thighs and the outer areas of the buttocks of the occupant. By manually adjusting the ride height of the outer cushion with respect to the inner cushion, the occupant can change the pressure distribution from completely supported by the inner cushion against the pelvis and consequently directly through the base of the spine, to completely supported by the thighs and outer buttock areas and indirectly to the spine through the hips.

When the body is supported solely by the outer cushion, the weight of the legs and lower torso is taken directly through the seat, thus reducing the load transmitted through the pelvis and the lower spine, and the upper body weight is supported in a more naturally balanced manner through the hips. When the body is supported solely by the outer cushion, the effective spring rate of the seat system is reduced to approximately one half of that of a single seat system, due to the arrangement of two air actuators acting in tandem. A damping device such as a hydraulic shock absorber may be connected between the base and either of the seat sub-bases so as to dampen repetitive oscillations of the seat cushions in the vertical direction. The provision for independent height adjustment of the outer cushion with respect to the inner cushion from time to time, permits the occupant to re-distribute the seat pressure so as to allow blood circulation to be maintained more properly, and to vary the load pattern in the joints and in the lower vertebrae and associated discs in order to minimize rupture, herniation or other injury to the discs. Furthermore, the outer cushion may be mounted on a pivoted plate with an adjusting means to vary the amount of support provided to the lower thighs.

The present invention may thus offer one or more of the following advantages over prior art:

a) The ability to support the occupant's body weight entirely through the thighs and outer areas of the buttocks, with provision to adjustably support a portion or all of the body weight directly through the pelvis and base of the spine.

b) The ability to maintain good blood circulation in the body parts which are in supportive contact with the seat, by redistributing support pressure from time to time.

c) The ability to reduce long term joint fatigue in the lower back and pelvic areas, by redistributing support pressure from time to time.

d) The ability to absorb more impact energy caused by travel over rough terrain than prior art seats may offer, by means of a lower effective spring rate of the seat system, utilizing an arrangement of two air actuators acting in tandem to support the outer seat cushion.

In summary, the present invention is a seat or chair with dual independently adjustable supports including an inner seat disposed for supporting the lower spine and adjacent inner buttocks region of a user sitting in the seat and an outer seat having a generally U-shape when viewed in plan form and mounted so as to surround the inner seat, disposed so as to support the thighs and outer buttocks region of the user. Means are mounted to the inner seat for selectively raising and lowering the inner seat. Means are mounted to the outer seat for selectively raising and lowering the outer seat. Horizontal stabilizing means which may include cross-struts, thrust bearings or washers including step bushings mounted between moving parts of the linkages providing vertical movement horizontally stabilize the vertical movement of the inner and outer seat. Control means cooperate with the means mounted to the inner seat for selectively raising and lowering the inner seat, for controlling the vertical position of the inner seat. Control means cooperate with the means mounted to the outer seat for selectively raising and lowering the outer seat, for controlling the vertical position of the outer seat. Support means are mounted to a support base for supporting the means mounted to the inner seat and the means mounted to the outer seat for selectively raising and lowering the inner and outer seats respectively. The means mounted to the inner and outer seats for selectively raising and lowering the inner and outer seats respectively serve as a pair of resilient means acting in tandem to resiliently support the inner and outer seats, and wherein the force of the resilient biasing by the resilient means may be selectively reduced by lowering the inner seat relative to the outer seat.

The inner and outer seats may be mounted on inner and outer sub-plates respectively. In one embodiment the outer sub-plate is pivotally mounted to an outer seat platform. A pivot angle of the outer sub-plate is adjusted by an adjusting means which may include at least one cam mounted on a rotatable pivot shaft mounted to the outer seat platform. The cam in such an embodiment may have an array of flat faces thereon such that the adjustable sub-plate is supported at any one time by one flat face of the cam. Each flat face of the array of flat faces of the cam provides for a different the pivot angle for the adjustable sub-plate.

An adjustable resilient support may be mounted to the inner seat and/or the outer seat. The spring support may include an air actuator, which may itself include an air spring. The air actuator may be mounted so as to act between the support base and the inner seat such that the inner seat is raised with respect to the support base when the air actuator is extended, or may be mounted so as to act between the inner seat and the outer seat such that the outer seat is raised with respect to the inner seat when the air actuator is extended, or may be mounted so as to act between the support base and the outer seat such that the outer seat is raised with respect to the support base when the air actuator is extended. Resiliently damping shock absorbers may be mounted so as to act between the support base and the outer seat, and between the support base and the inner seat.

The stabilizing device may include a first parallelogram linkage of pivotally mounted arms so as to allow the inner seat to remain substantially horizontal as it moves in an arc determined by the pivoting of the first parallelogram, where a first end of the first parallelogram is pivotally mounted to the support base, and an opposite second end of the parallelogram is pivotally mounted to the inner seat. The stabilizing device may also include a second parallelogram linkage of pivotally mounted arms so as to allow the outer seat to remain substantially horizontal as it moves in an arc determined by the pivoting of the second parallelogram, where a first end of the second parallelogram is pivotally mounted to the outer seat, and an opposite second end of second parallelogram is pivotally mounted to either the inner seat or the support base.

The inner and outer seat may include a seat cushion having at least one inflatable bladder element.

BRIEF DESCRIPTION OF THE DRAWINGS

The invention will be better understood by reference to the accompanying drawings, wherein:

FIG. 5b is, in elevation view, the linkage arm of FIG. 5a.

FIG. 5c is, in perspective view, a step bushing in the arm of FIG. 5a.

DETAILED DESCRIPTION OF EMBODIMENTS OF THE INVENTION

Figure 1:
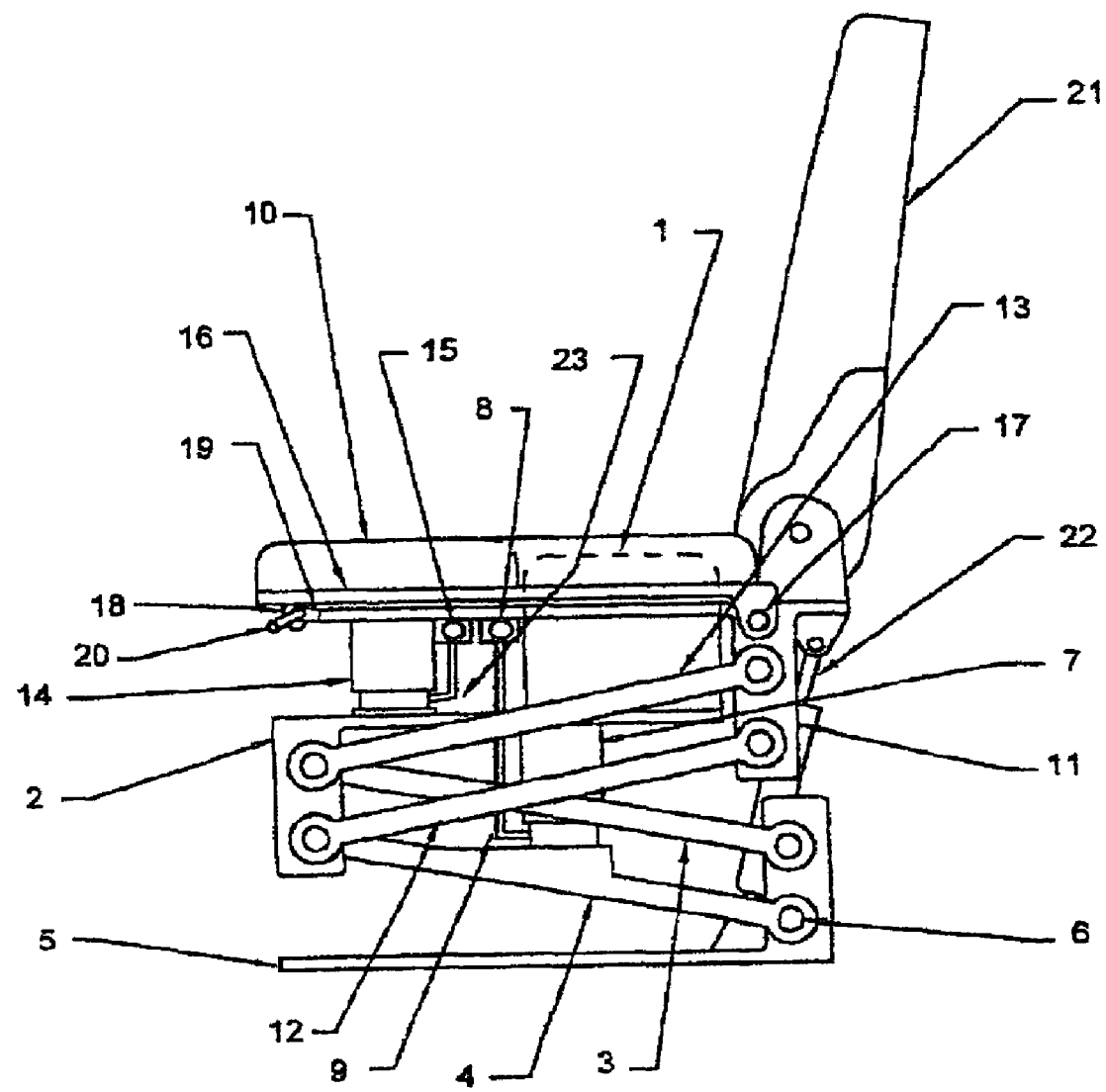
FIG. 1 depicts in right side an elevation view a dual ride seat apparatus according to one embodiment of the present invention.
Figure 2:
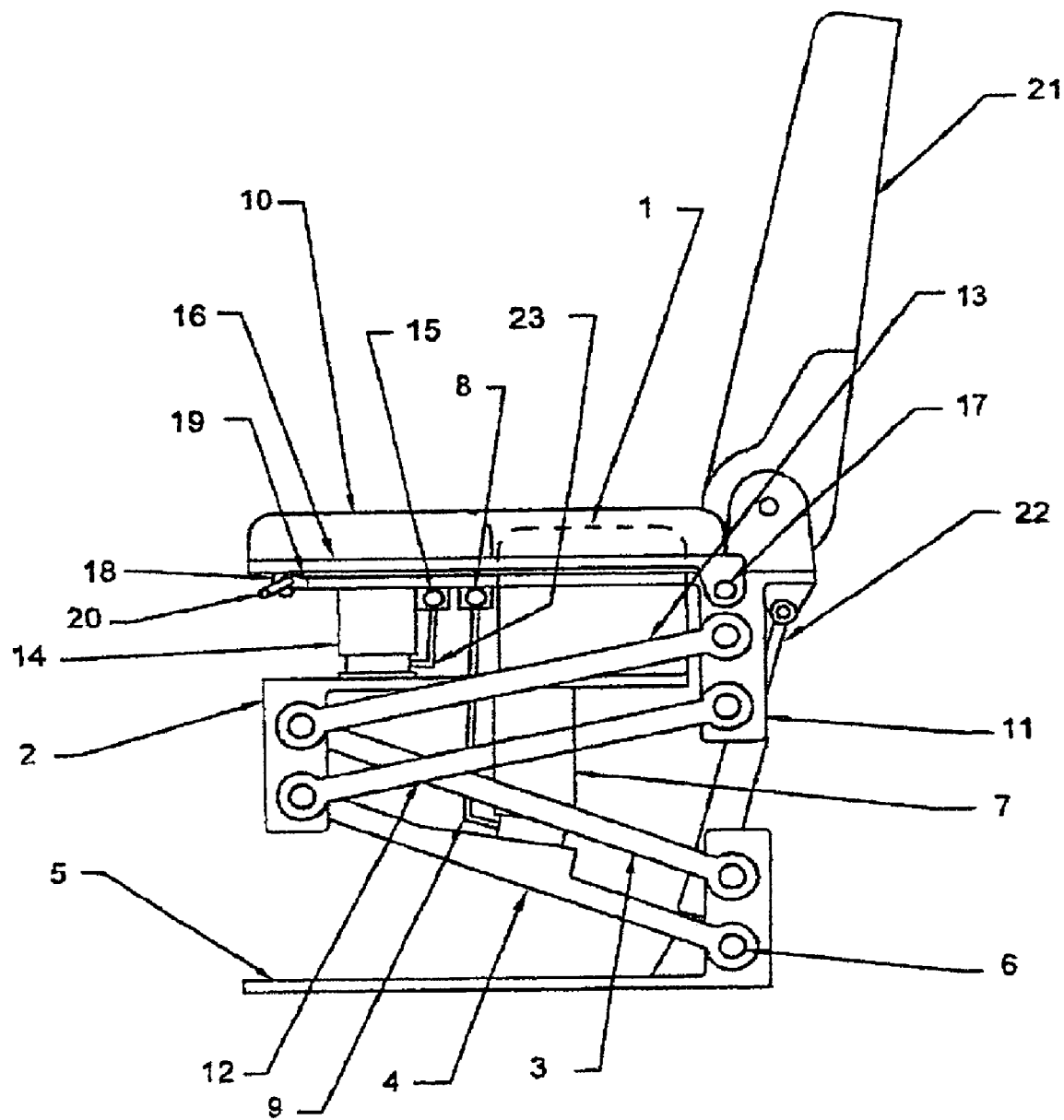
FIG. 2 is a right side elevation view as in FIG. 1, depicting the seat in a first raised position.
Figure 3:
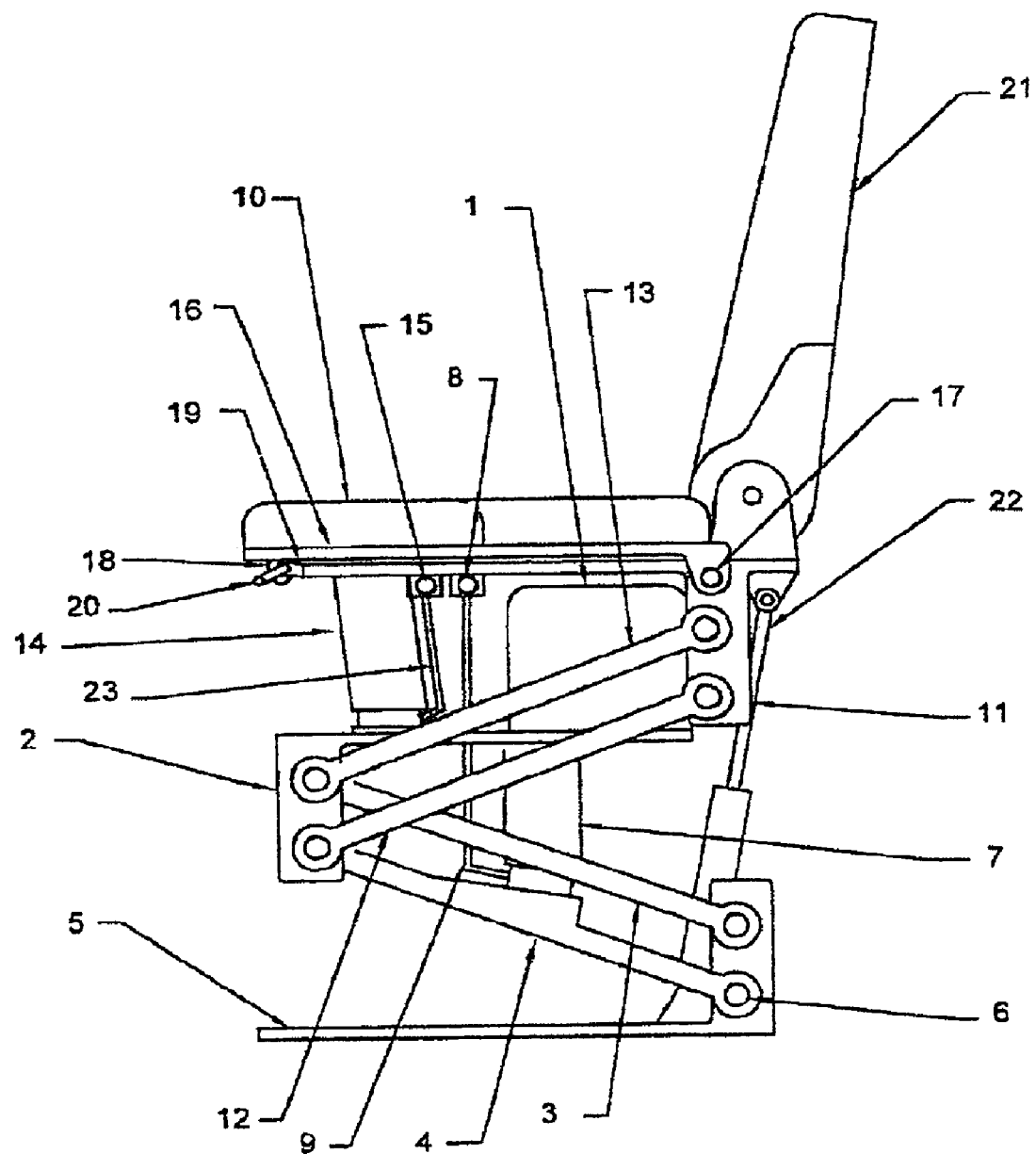
FIG. 3 is a right side elevation view as in FIG. 1, depicting the seat in a second raised position.
Figure 5:
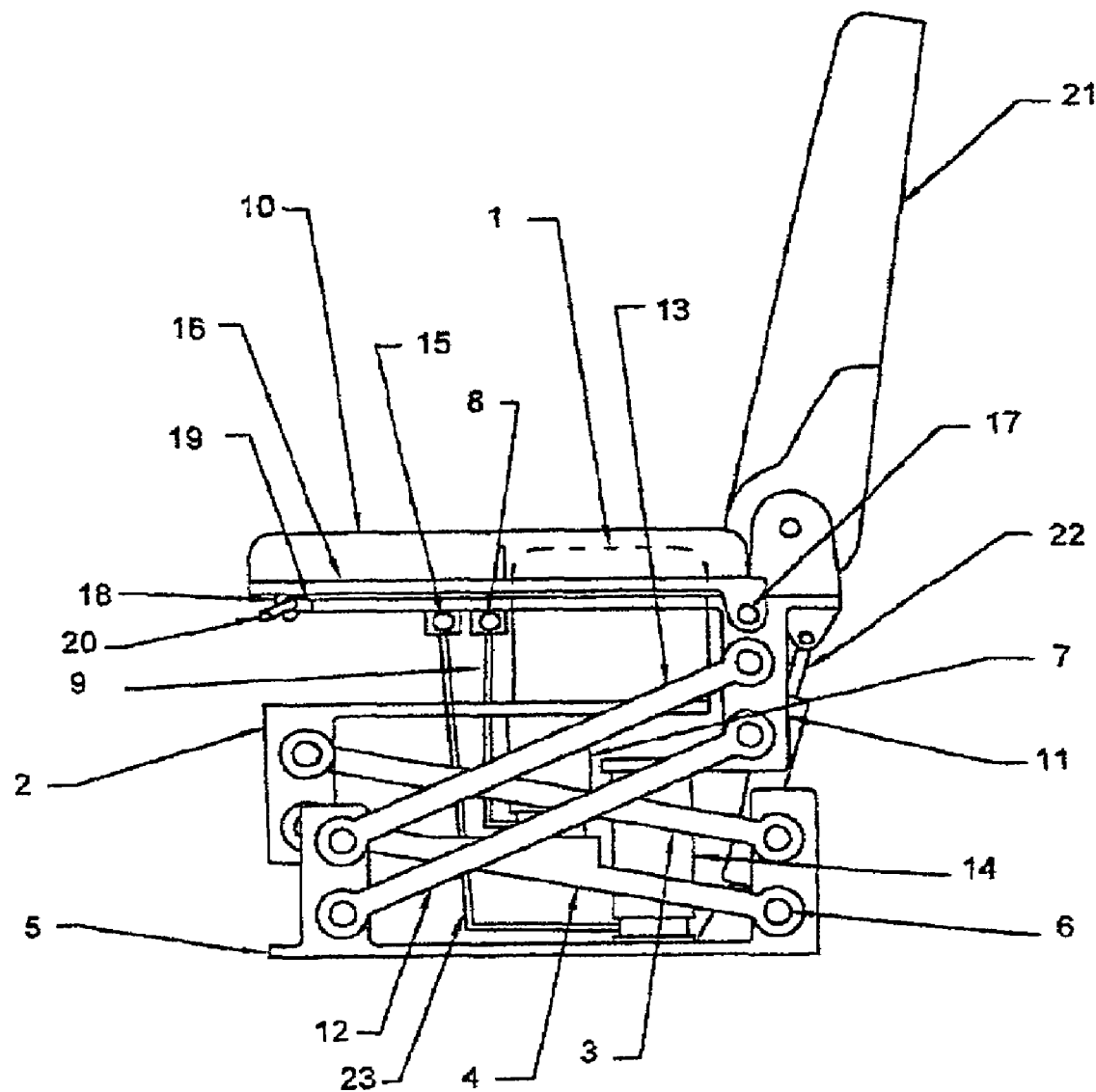
FIG. 5 is a right side elevation view according to a second embodiment of the dual ride seat of the present invention.
Figure 5A:
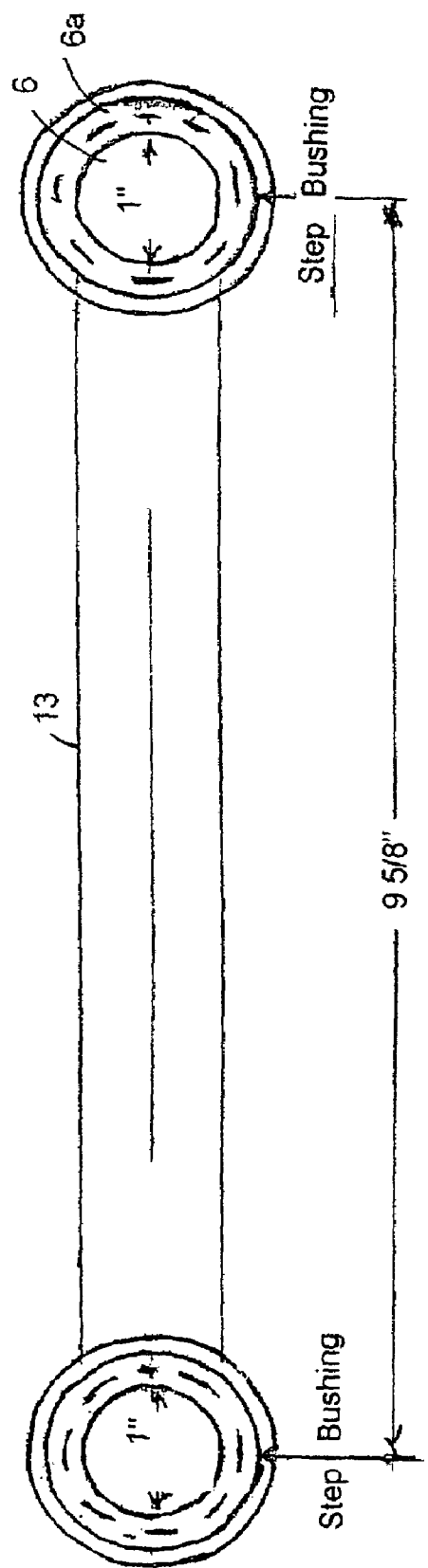
FIG. 5a is, in plan view, one upper linkage arm of the seat of FIG. 1.
Figure 5B:
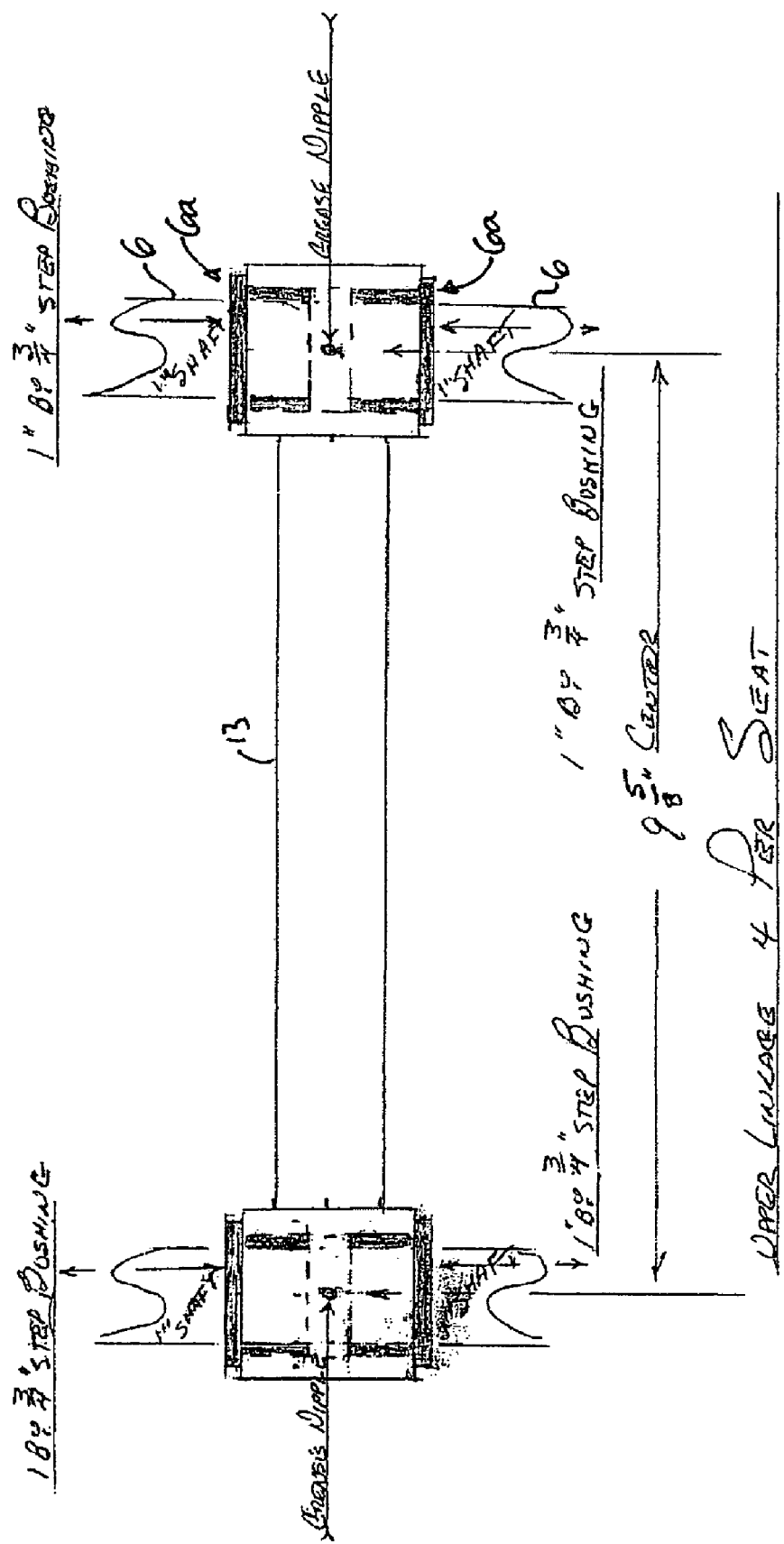
Figure 5C:
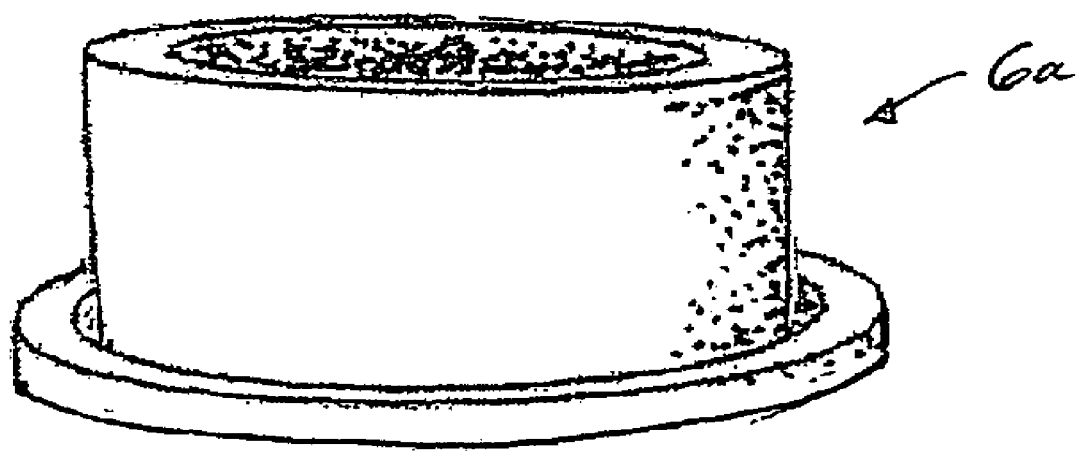
Figure 6:
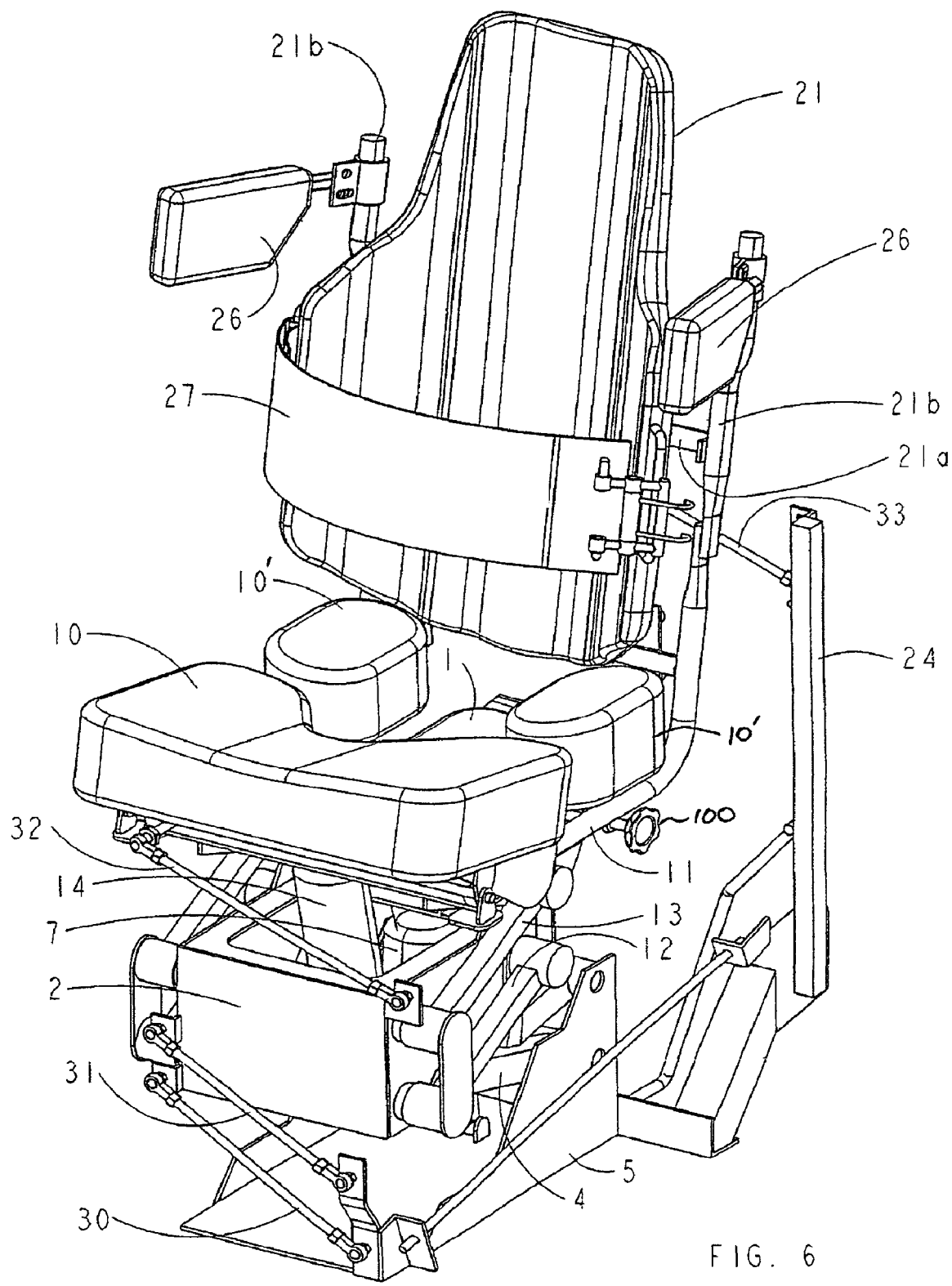
FIG. 6 is, in front perspective view, a further embodiment of the seat of FIG. 1.
Figure 7:
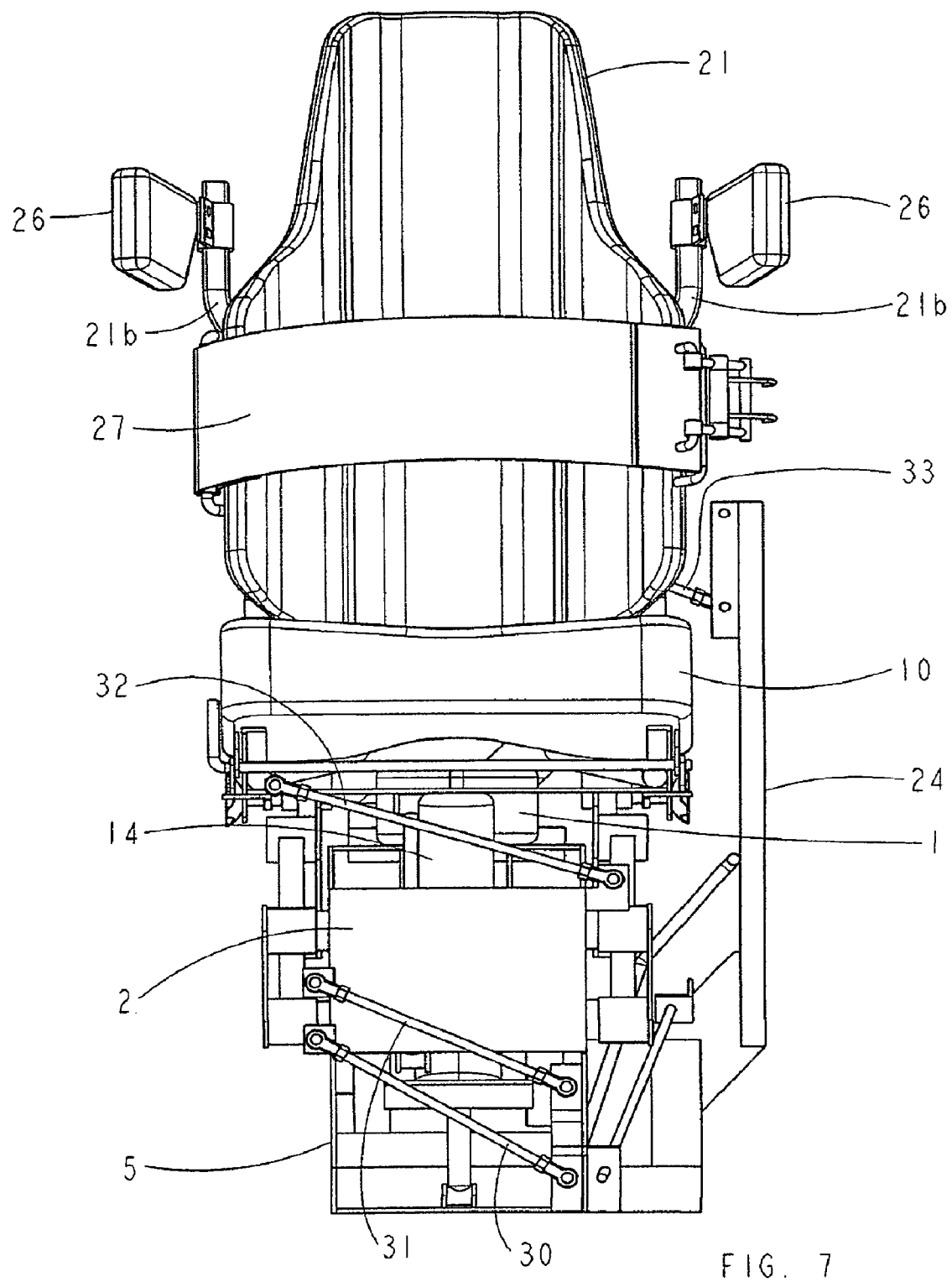
FIG. 7 is, in front elevation view, the seat of FIG. 6.
Figure 8:
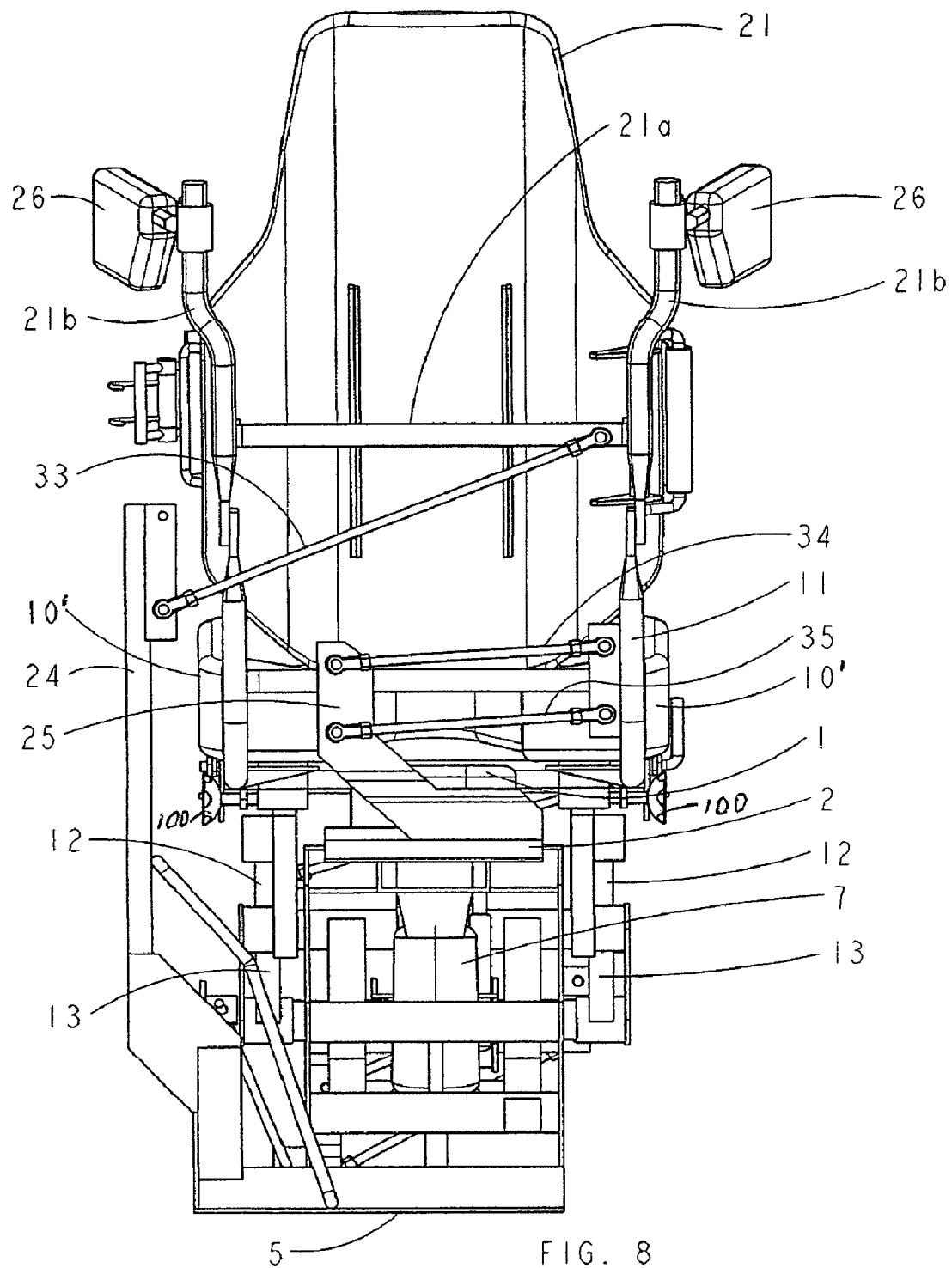
FIG. 8 is, in rear elevation view, the seat of FIG. 6.
Figure 9:
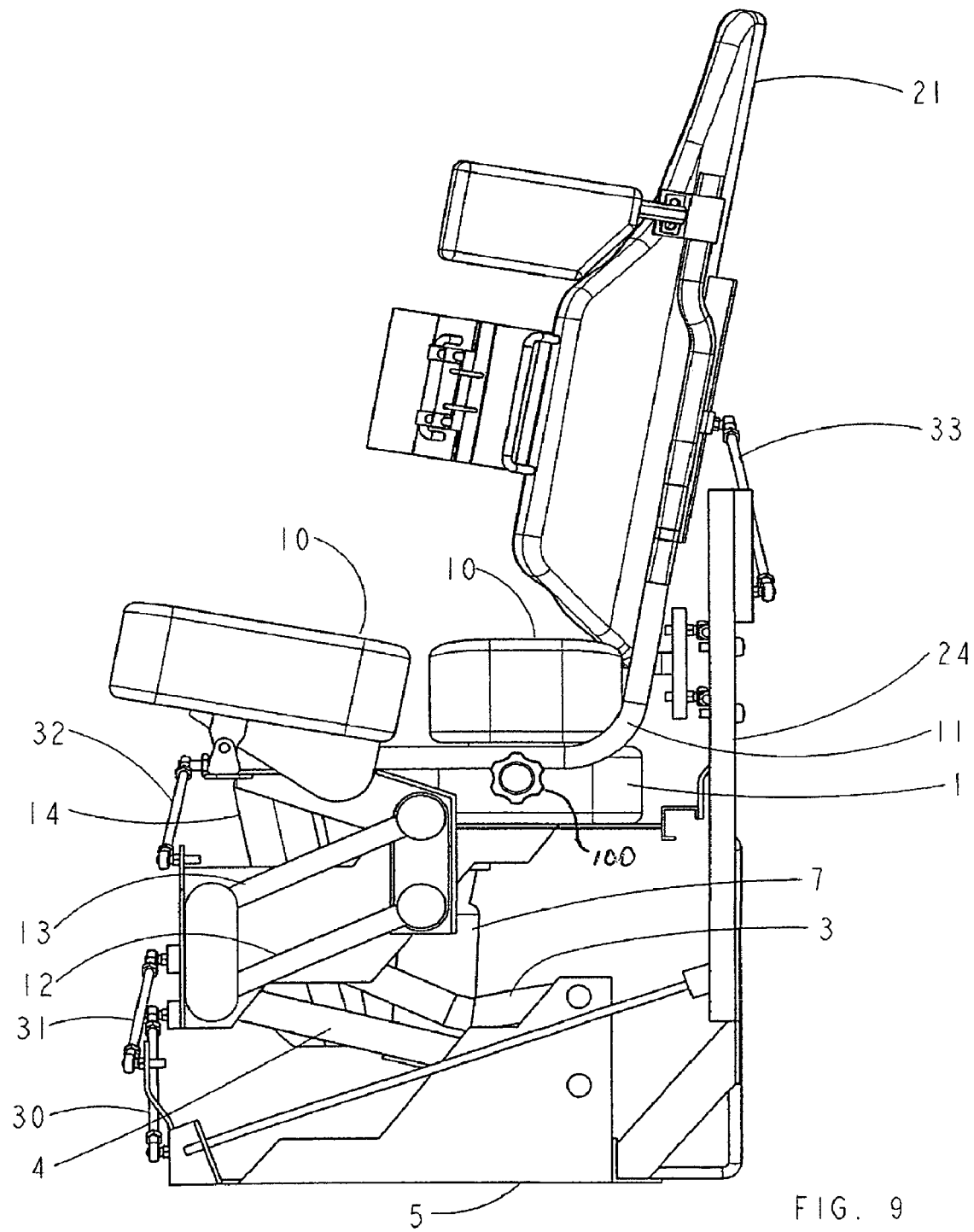
FIG. 9 is, in left side elevation view, the seat of FIG. 6.
Figure 10:
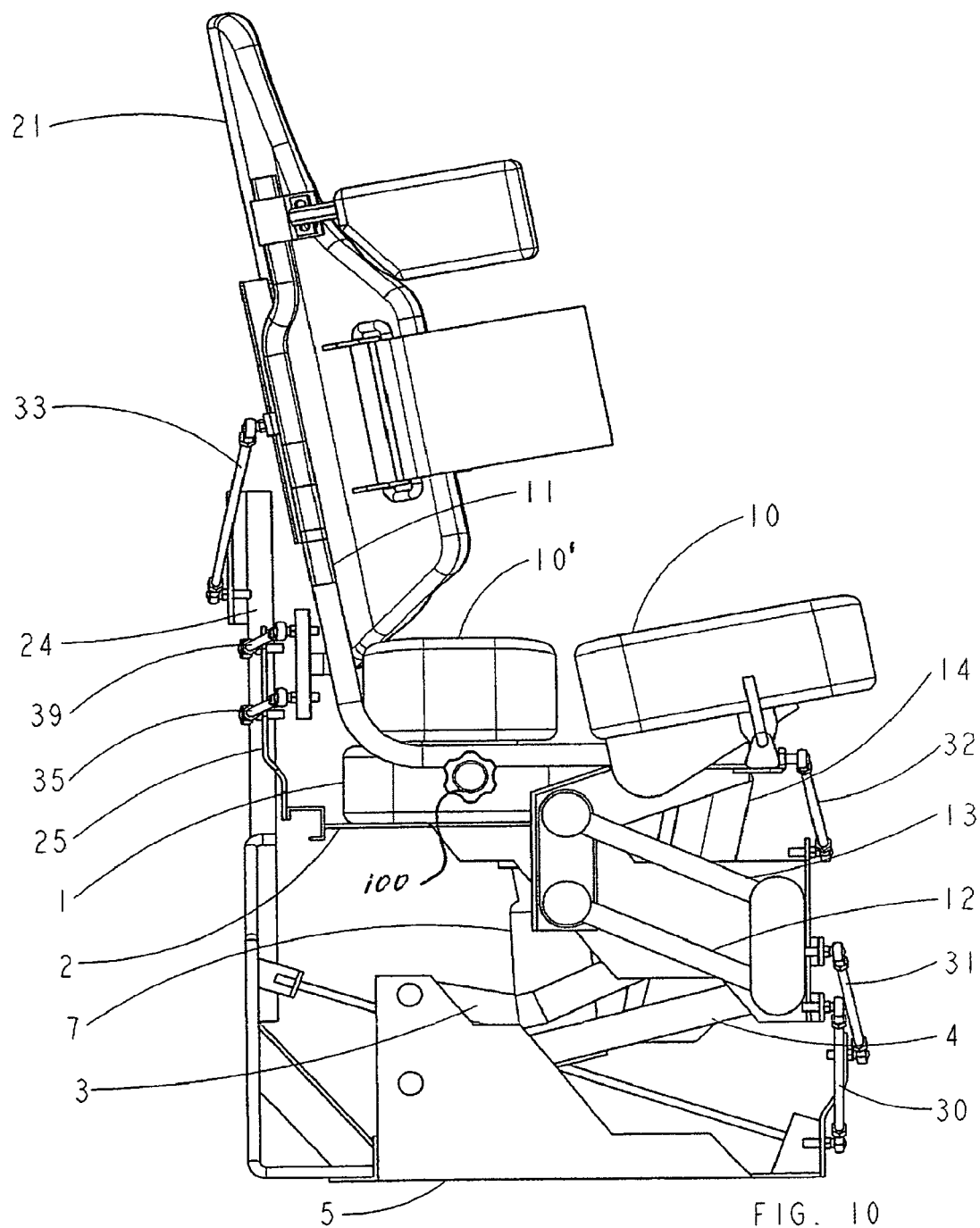
FIG. 10 is, in right side elevation view, the seat of FIG. 6.
Figure 11:
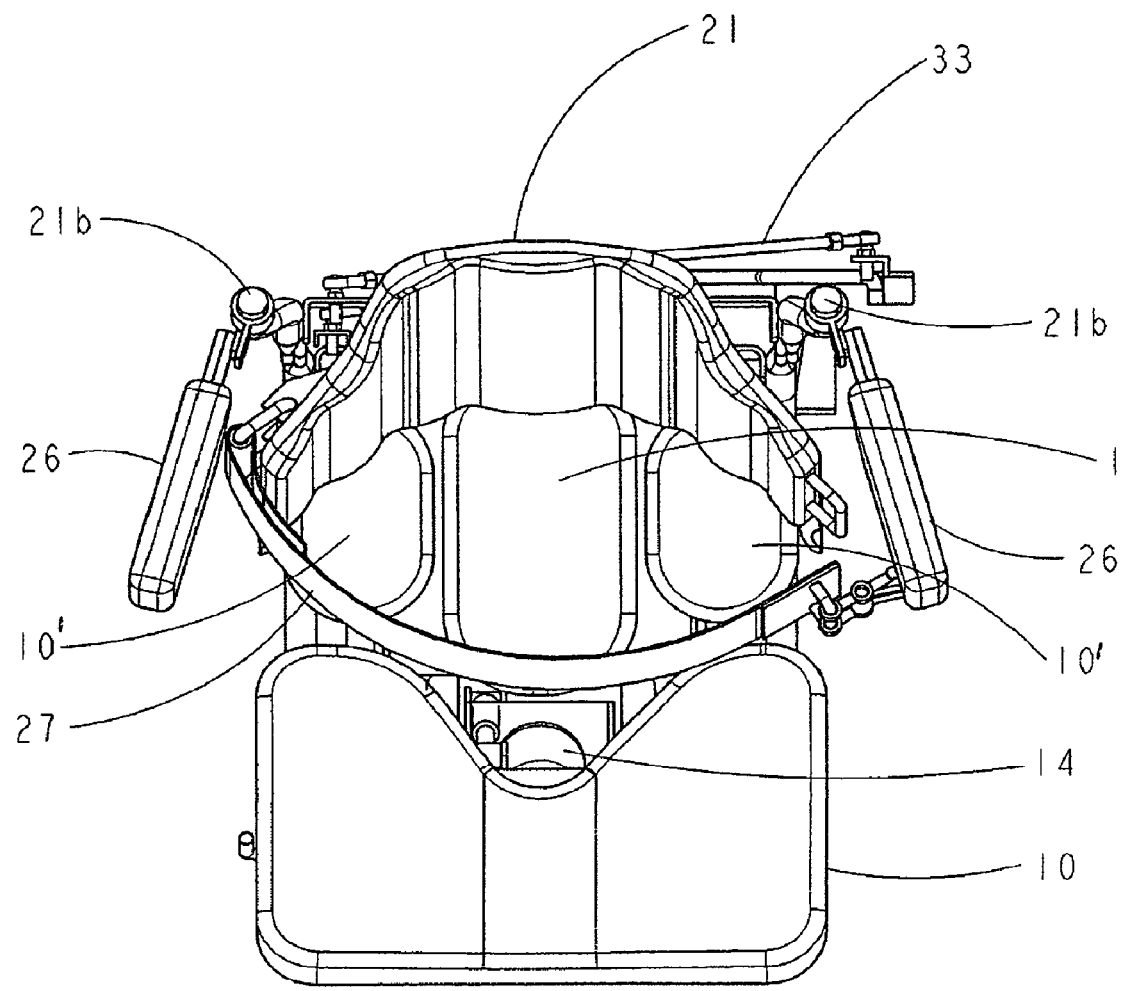
FIG. 11 is, in plan view, the seat of FIG. 6.

As best seen in FIGS. 1, 2 and 3, according to one embodiment of the present invention, the inner seat cushion 1, shown in partially dotted outline in FIGS. 1 and 2, is mounted on a first sub-base 2. First sub-base 2 is suspended by being pivotally mounted to two pairs of lower parallel arms 3 and 4, wherein the pair of lower parallel arms 3 comprise a pair of arms of which only the near arm is visible as drawn, and wherein lower parallel arms 4 comprise a pair of arms of which only the near arm is visible as drawn, and wherein the lower two pair of parallel arms 3 and 4 are pivotally attached to a fixed base 5. Pins or shafts 6 permit free rotation of the lower parallel arms 3 and 4 in a vertical plane only, perpendicular to the pin 6 axis. A first air actuator 7 is mounted between the first sub-base 2 and the lower pair of parallel arms 4 so that air pressure, when admitted to the first air actuator 7 causes the first sub-base 2 to be lifted with respect to the base 5 as the force generated by the first air actuator acts through the first sub-base 2, the two pairs of lower parallel arms 3 and 4, and the base 5. Air supply to the first air actuator 7 is controlled by a manually operated first valve 8, and routed to the first air actuator 7 via tubing and fittings 9. Compressed air may be provided from an air brake system compressor, or from a separate compressor mounted in the vehicle, not shown in the drawings. An outer seat cushion 10 is pivotally attached to a second sub-base 11, which is suspended by pivotally mounted two pairs of upper parallel arms 12 and 13, wherein the pair of upper parallel arms 12 comprise a pair of arms of which only the near arm is visible as drawn, and wherein the two pair of upper parallel arms 12 and 13 are pivotally attached to the first sub-base 2. Pins 6 permit free rotation of the upper parallel arms 12 and 13 in a vertical plane only, perpendicular to the pin 6 axis. A second air actuator 14 is mounted between the second sub-base 11 and the first sub-base 2 so that air pressure, when admitted to the second air actuator 14 causes the second sub-base 11 to be lifted with respect to the first sub-base base 2 as the force generated by the second air actuator acts through the second sub-base 11, the two pairs of parallel arms 12 and 13, and the first sub-base 2. Air supply to the second air actuator 14 is controlled by a manually operated second valve 15 via tubing and fittings 23. Pins or shafts 6 are rotatably mounted in the collared ends of arms 3, 4, 12 and 13. Horizontal stabilization of the arms may be assisted by the use of step bushings or thrust washers such as step bushings 6a seen in FIGS. 5a-5c. For example, not intended to be limiting, step bushings 6a may be one inch or three quarters of an inch step bushings. The step bushings may be mounted in the collared ends of the arms and in the corresponding mounting ports where pins or shafts 6 are mounted to or journalled through the corresponding base or sub-base of the seat.

Figure 4:
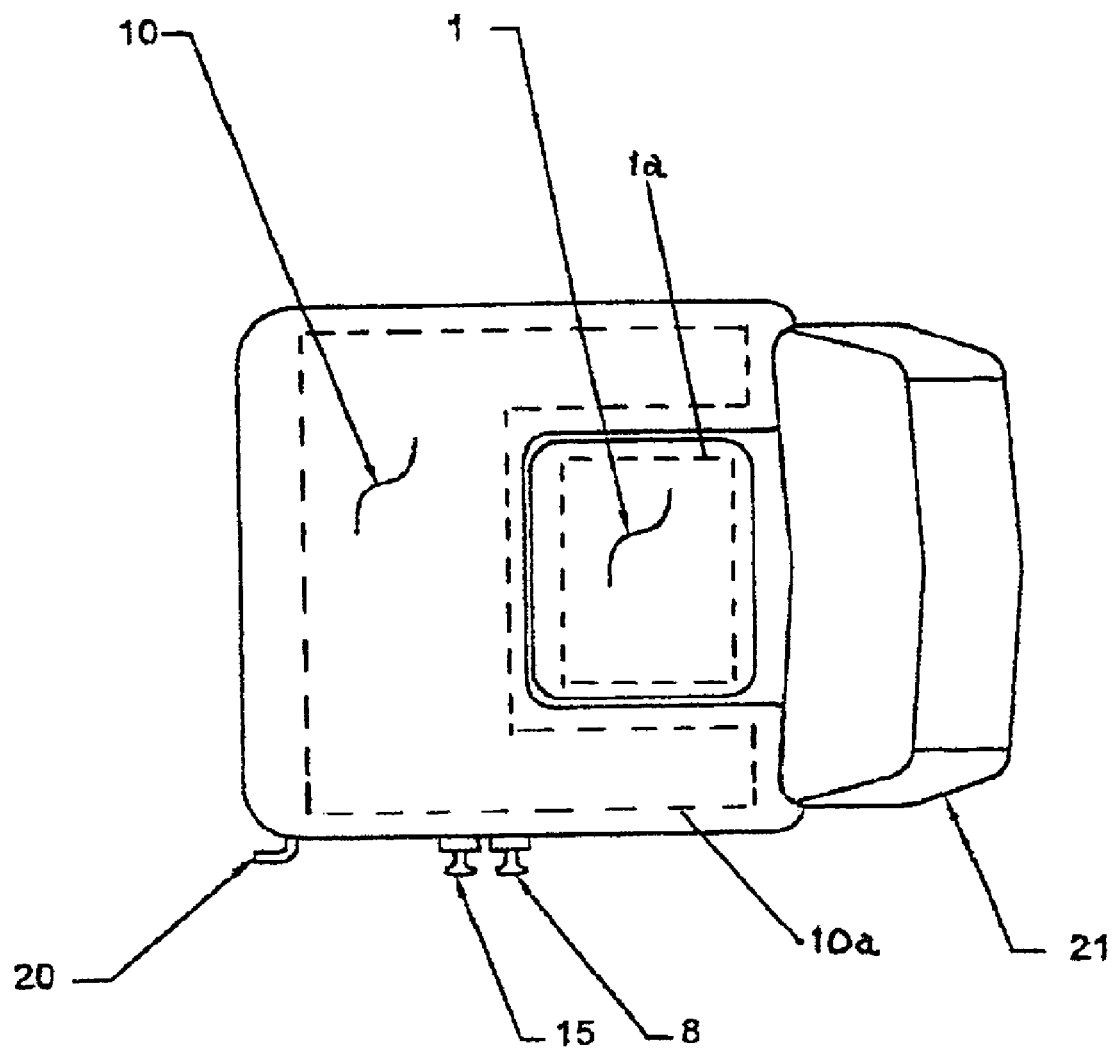
FIG. 4 is a plan view of the seat of FIG. 1, depicting the layout of the seat cushions.

In operation, the dual ride seat apparatus is lowered to an entry/exit position as depicted in FIG. 1, wherein the first air actuator 7 and the second air actuator 14 are in a substantially retracted state. When an occupant is seated, the occupant manually actuates valve 8 to cause air to be supplied to the first air actuator 7. As the first air actuator 7 extends, the first sub-base 2 is caused to raise, and consequently both the inner seat cushion I and the outer seat cushion 10 are raised together, as depicted in FIG. 2. When the occupant of the seat chooses to increase the support to the occupant's thighs and outer buttocks, the occupant manually actuates valve 15 to cause air to be. supplied to the second air actuator 14. As the second air actuator 14 extends, the second sub-base 11 is caused to raise, and consequently the outer seat cushion 10 is raised with respect to the first sub-base 2, as depicted in FIG. 3. To summarize the operation of the seat, the first valve 8 controls the overall ride height of the dual ride seat, while the second valve 15 controls the distribution of support of the occupant's body, between the inner seat cushion I and the outer seat cushion 10. The outer seat cushion 10 is mounted on a sub-plate 16. Air bladders 1a and 10a (shown in dotted outline by way of example in FIG. 4) may be used to selectively inflate or deflate the inner seat cushion or the outer seat cushion respectively, or to change its support angle on the sub-plate. Alternatively sub-plate 16 may be pivotally attached to the second sub-base 11 by pins 17 so that the sub-plate 16 may rotate in a vertical plane parallel with the plane of rotation of the pairs of parallel arms 3,4, II, and 12. Sub-plate 16 is supported at the opposite end from the pins 17 by a multi-faced cam 18. Cam 18 is supported by bearings 19 which are mounted on the second sub-base 11. A crank arm 20 is connected to cam 18 50 as to permit the occupant of the seat to rotate the cam 18 thereby incrementally changing the angle of the sub-plate 16 with respect to the sub-base 11. A damping device 22 such as a commercial shock absorber is attached between the second sub-base 11 and the base 5 to damp out oscillations, which would occur. due to the spring nature of the first air actuator 7 and the second air actuator 14. A similar second damping device, not shown in the drawings, may be applied similarly between the base 5 and the first sub-base 2 so as to increase the total damping effect.

In one embodiment not intended to be limiting, seat back 21 is attached to the second sub-base 11 by attaching means commonly used in commercial seat construction. It is intended to be within the scope of the present invention to employ the dual-ride seat in applications including transport, heavy-duty equipment, office, etc and irrespective of the type of, or presence of, a particular seat back. It is the dual support function beneath the user which is important.

In a second embodiment of the present invention, not shown in the drawings, the elements remain substantially as described in the first embodiment, with the exception of the positioning of the second air actuator 14 and the pairs of upper parallel arms 12 and 13. The second air actuator is mounted so as to act between the second sub-base 11 and the base 5. The second sub-base 11 is suspended by pivotally mounted two pairs of upper parallel arms 12 and 13, and the two pairs of upper parallel arms are pivotally attached to the base 5. In this second embodiment, the inner seat cushion 1 and the outer seat cushion 10 are manually adjusted completely independently. The air actuators 7 and 14 do not act in tandem, and the overall ride height is adjusted by the operation of both valves 8 and 15. An advantage of this second embodiment is the possibility of reducing the overall height of the seat in its lowest position. In a further embodiment the self-dampening ride afforded by the seat according to one aspect of the present invention is enhanced by the use of two airbags, that is where one compliments or cooperates with the other, so as to further assist dampening vertical translation of the sub-base to which it is mounted, for example the sub-base supporting the outer seat.

In the embodiments of FIGS. 6-11, the chair is laterally stabilized by pivotally mounted cross-struts. In particular, cross-struts 30-35 are pivotally mounted between, respectively: fixed base 5 and first sub-base 2 for cross-struts 30 and 31; first sub-base 2 and second sub-base 11 for cross-strut 32; fixed base vertical frame member 24 and seat back frame 21a for cross-strut 33; and, first sub-base vertical frame member 25 and second sub-base 11. Vertical frame members 24 and 25 are rigidly mounted to fixed base 5 and first sub-base 2 respectively. Shoulder supports 26 and back support 27 are pivotally mounted to vertical supports 21b rigidly mounted to frame 21a. Back support 27 may be a six inch wide resilient belt or band or other resilient torso restraint to assist maintaining properly aligned posture of the user's back and spine. The shoulder supports 26 also assist in this regard, stabilizing lateral swaying movement.

Figure 12:
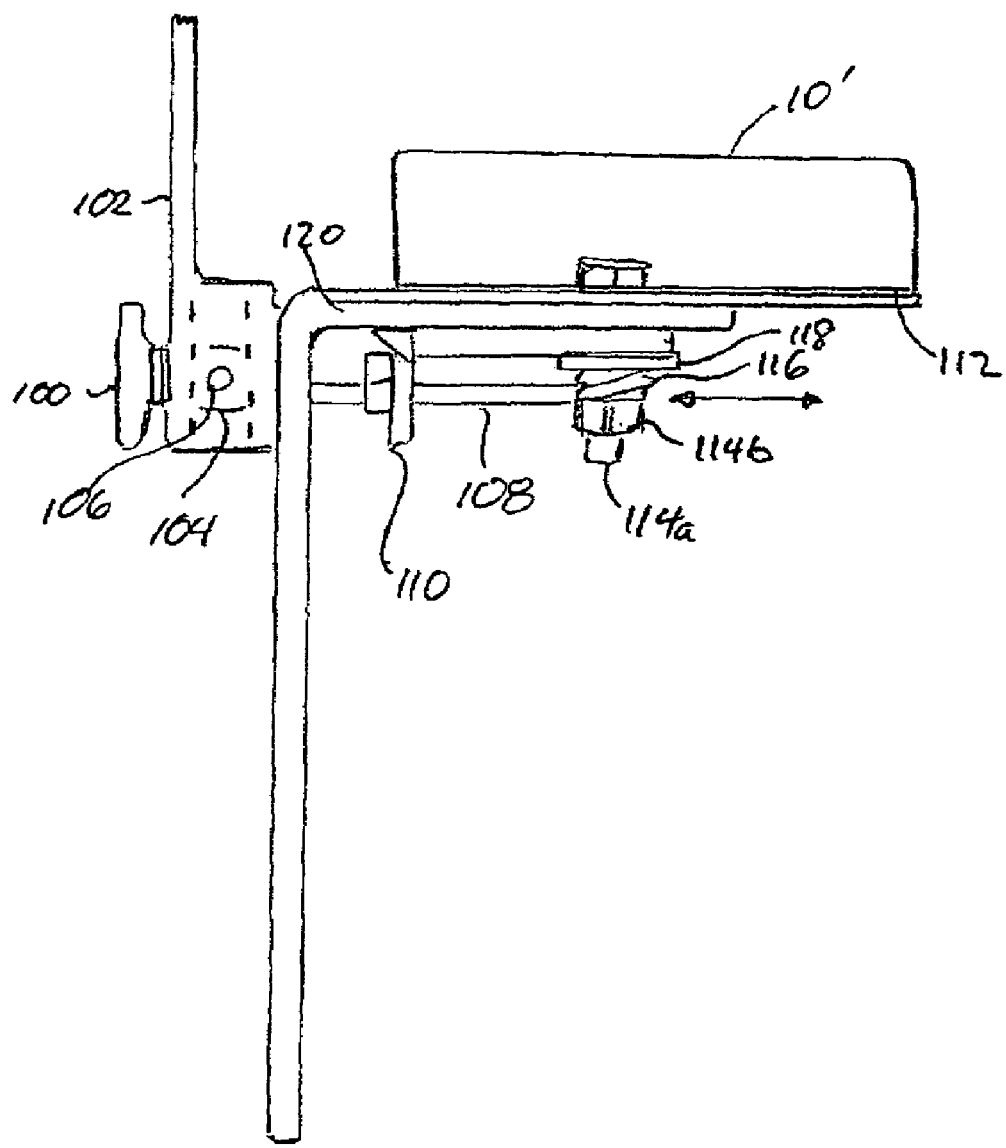
FIG. 12 is, in partially cut away rear perspective view, a sideways motion adjuster for a side seat cushion.

FIG. 12 illustrates in partially cut away rear elevation view, how a side seat cushion 10' may be laterally selectively positioned by rotation of lateral adjusting knob 100. In particular, adjusting knob 100 is mounted through the upper seat bracket 102 through collar 104 having a set screw 106 to threaded adjusting rod 108. Threaded rod 108 is threadably journalled through correspondingly threaded plate 110 so that rotation of knob 100 rotates threaded rod 108 in plate 110 so as to laterally translate threaded rod 108 in the direction of the arrows illustrated in FIG. 12. Cushion 10' is mounted to the distal end of threaded rod 108. In particular, cushion 10' is advantageously mounted on a plate 112 and plate 112 is mounted to the distal end of threaded rod 108 by means of bolt 114a and corresponding nut 114b. Nut 114b impresses a tension spring 116 against a washer 118. The support plate 120 supporting cushion 10' has a laterally extending slot through which bolt 14a may slide as the lateral. position of the bolt, plate 112 and cushion 10' is laterally adjusted by rotation of knob 100. It is understood that, although only the left side seat cushion and adjusting assembly is illustrated in FIG. 12, that a mirror image exists for the right side of the seat.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A dual ride seat apparatus two-part seat assembly comprising:
   (a) an inner seat disposed for supporting a lower spine and adjacent inner buttocks region of a user when sitting in the vehicle seat,
   (b) an outer seat having a generally U-shape and mounted so as to surround said inner seat, disposed so as to support thighs and outer buttocks region of the user,
   (c) means mounted to said inner seat for selectively raising and lowering said inner seat,
   (d) means mounted to said outer seat for selectively raising and lowering said outer seat,
   (e) control means, cooperating with said means mounted to said inner seat for selectively raising and lowering said inner seat, for controlling the vertical position of said inner seat,
   (f) a control means, cooperating with said means mounted to said outer seat for selectively raising and lowering said outer seat, for controlling the vertical position of said outer seat,
   (g) a support base, support means mounted to said support base for supporting said means mounted to said inner seat and said means mounted to said outer seat for selectively raising and lowering said inner and outer seats respectively,
wherein said means mounted to said inner and outer seats for selectively raising and lowering said inner and outer seats respectively provides a pair of resilient means acting in tandem to resiliently support said inner and outer seats.

2. The assembly of claim 1 further comprising lateral position adjusting means cooperating with at least a pair of rearward laterally outer portions of said outer seat for selectively laterally positioning said outer portions relative to said inner seat.

3. The assembly of claim 1 further comprising an adjustin angle of an outer sub-plate, wherein said adjusting means includes at least one cam mounted on a rotatable pivot shaft mounted to said outer seat platform.

4. The assembly of claim 3 wherein said inner and outer seats are mounted on inner sub-plate and said outer sub-plates respectively, and wherein said outer sub-plate is pivotally mounted to an outer seat platform, and wherein said pivot angle of said outer sub-plate is adjusted by said adjusting means,
wherein said at least one cam includes a cam having an array of flat faces thereon such that the adjustable sub-plate is supported by one flat face of said cam, and wherein each flat face of the array of flat faces of said cam provides for a different said pivot angle for said adjustable sub-plate.

5. The assembly of claim 1 further comprising an adjustable resilient support mounted to said inner seat, and wherein said adjustable resilient support includes an air actuator.

6. The assembly of claim 5 wherein said air actuator includes an air spring.

7. The assembly of claim 6 wherein the said air actuator is mounted so as to act between said support base and said inner seat such that said inner seat is raised with respect to said support base when said air actuator is extended.

8. The assembly of claim 1 including an adjustable resilient support for said outer seat which includes an air actuator.

9. The assembly of claim 8 wherein said air actuator includes an air spring.

10. The assembly of claim 8 wherein said air actuator is mounted so as to act between said inner seat and said outer seat such that said outer seat is raised with respect to the inner seat when said air actuator is extended.

11. The assembly of claim 8 wherein said air actuator is mounted so as to act between said support base and said outer seat such that said outer seat is raised with respect to said support base when said air actuator is extended.

12. The assembly of claim 1 wherein a resiliently damping shock absorber is mounted so as to act between said support base and said outer seat.

13. The assembly of claim 12 wherein a resiliently damping absorber is mounted so as to act between said support base and said inner seat.

14. The assembly of claim 1 further comprising horizontal stabili horizontally stabilizing vertical movement of said inner seat, and horizontal stabilizing means for horizontally stabilizing vertical movement of said outer seat.

15. The assembly of claim 14 wherein said horizontal stabilizing means for horizontally stabilizing vertical movement of said inner seat comprises pivotally mounted arms including means to maintain the inner seat substantially horizontal as it moves in an arc determined by pivoting of said arms, and wherein a first end of said arms are pivotally mounted to said support base, and wherein an opposite second end of said arms are pivotally mounted to said inner seat.

16. The assembly of claim 15 wherein said horizontal stabilizing means for horizontally stabilizing vertical movement of said outer seat comprises a parallelogram linkage of pivotally mounted arms so as to allow said outer seat to remain substantially horizontal as it moves in an arc determined by the pivoting of said parallelogram, and wherein a first end of said parallelogram is pivotally mounted to said outer seat, and wherein an opposite second end of said parallelogram is pivotally mounted to said inner seat.

17. The assembly of claim 1 wherein said control means for controlling the vertical position of said inner seat is pneumatic.

18. The assembly of claim 1 wherein said control means for controlling the vertical position of said outer seat is pneumatic.

19. The assembly of claim 1 wherein said inner seat includes a seat cushion having at least one inflatable bladder element.

20. The assembly of claim 1 wherein said outer seat includes a seat cushion having at least one inflatable bladder element.

21. The assembly of claim 1 further comprising a substantially vertical back support having an elongate torso restraint mounted thereto for constraining around a use's torso constraining the torso against said back support.

22. The assembly of claim 21 wherein said torso restraint is a flexible band extending laterally across said back support so as to sandwich the torso between said band and said back support.

23. The assembly of claim 22 wherein said band is resilient.

24. The assembly of claim 21 further comprising a pair of shoulder restraints mounted to said back support so as to extend forwardly from opposite sides of said back support and above said torso restraint.

25. The assembly of claim 1 further comprising a stabilizing device including a parallelogram linkage of pivotally mounted arms so as to allow said outer seat to remain substantially horizontal as it moves in an arc determined by the pivoting of said parallelogram, and wherein a first end of said parallelogram arm is pivotally mounted to the outer seat, and wherein an opposite second end of each parallelogram is pivotally mounted to the support base.

* * * * *